United States Patent
Lyngsø et al.

(10) Patent No.: US 11,698,484 B2
(45) Date of Patent: Jul. 11, 2023

(54) REDUCING LIGHT-INDUCED LOSS IN OPTICAL FIBRE

(71) Applicant: NKT Photonics A/S, Birkerød (DK)

(72) Inventors: Jens Lyngsø, Birkerød (DK); Cameron Smith, Birkerod (DK); Anders Harpøth, Birkerod (DK); Christian Jakobsen, Birkerød (DK); Thomas Tanggard Alkeskjold, Birkerod (DK); Imis Kubat, Birkerød (DK)

(73) Assignee: NKT PHOTONICS A/S, Birkerød (DK)

( * ) Notice: Subject to any disclaimer, the term of this patent is extended or adjusted under 35 U.S.C. 154(b) by 0 days.

(21) Appl. No.: 16/632,932

(22) PCT Filed: Jul. 24, 2018

(86) PCT No.: PCT/EP2018/070038
§ 371 (c)(1),
(2) Date: Jan. 22, 2020

(87) PCT Pub. No.: WO2019/020627
PCT Pub. Date: Jan. 31, 2019

(65) Prior Publication Data
US 2020/0158946 A1      May 21, 2020

(30) Foreign Application Priority Data

Jul. 24, 2017   (GB) ...................... 1711849

(51) Int. Cl.
*G02B 6/02*       (2006.01)
*G02F 1/365*      (2006.01)
*G02F 1/35*       (2006.01)

(52) U.S. Cl.
CPC ..... *G02B 6/02338* (2013.01); *G02B 6/02342* (2013.01); *G02F 1/365* (2013.01);
(Continued)

(58) Field of Classification Search
CPC . G02B 6/02338; G02B 6/02342; G02F 1/365; G02F 1/3528; C03B 2201/12; C03B 2201/22; C03B 2201/28; C03B 2201/32
See application file for complete search history.

(56) References Cited

U.S. PATENT DOCUMENTS

| | | | | |
|---|---|---|---|---|
| 6,474,106 B1 * | 11/2002 | Crossland | ............. | C03B 37/027 65/390 |
| 7,813,611 B2 * | 10/2010 | Bennett | ............. | G02B 6/02395 385/128 |

(Continued)

FOREIGN PATENT DOCUMENTS

| | | |
|---|---|---|
| CN | 102147496 A | 8/2011 |
| CN | 106255907 A | 12/2016 |

(Continued)

OTHER PUBLICATIONS

Di Francesca, X-ray irradiation effects on fluorine-doped germanosilicate optical fibers, Optical Materials Express, V. 4, N. 8, 2014 (Year: 2014).*

(Continued)

*Primary Examiner* — Peter Radkowski
(74) *Attorney, Agent, or Firm* — Buchanan Ingersoll & Rooney P.C.

(57) ABSTRACT

A supercontinuum source, comprises a pump source and a supercontinuum generator configured for receiving electromagnetic radiation derived from the pump source and for generating supercontinuum radiation, the supercontinuum generator comprising a nonlinear microstructured optical fibre having a core region comprising silica. The core region includes a dopant selected to reduce light-induced non-bridging oxygen hole centre loss in the nonlinear microstructured optical fibre.

25 Claims, 5 Drawing Sheets

(52) U.S. Cl.
CPC ...... *C03B 2201/12* (2013.01); *C03B 2201/22* (2013.01); *C03B 2201/28* (2013.01); *C03B 2201/32* (2013.01); *G02F 1/3528* (2021.01)

(56) References Cited

U.S. PATENT DOCUMENTS

| | | | | |
|---|---|---|---|---|
| 7,907,810 | B2* | 3/2011 | Messerly | G02B 6/03611 |
| | | | | 365/126 |
| 8,045,259 | B2* | 10/2011 | Petersson | G02B 6/0238 |
| | | | | 359/337.2 |
| 9,586,853 | B2* | 3/2017 | Billings | C03B 37/01446 |
| 9,919,946 | B2* | 3/2018 | Billings | G02B 6/021 |
| 10,274,672 | B2* | 4/2019 | Lyngsøe et al. | G02B 21/0032 |
| 2006/0127018 | A1* | 6/2006 | Hamada | C03C 25/607 |
| | | | | 385/123 |
| 2008/0260338 | A1* | 10/2008 | Messerly | G02B 6/03611 |
| | | | | 385/127 |
| 2009/0126408 | A1* | 5/2009 | Bookbinder | C03B 37/01853 |
| | | | | 65/416 |
| 2009/0168149 | A1* | 7/2009 | Petersson | G02B 6/02357 |
| | | | | 359/339 |
| 2010/0061415 | A1 | 3/2010 | Mattsson | |
| 2010/0251775 | A1* | 10/2010 | Regnier | C03C 25/64 |
| | | | | 65/400 |
| 2011/0188825 | A1* | 8/2011 | Alkeskjold | B29D 11/00663 |
| | | | | 264/1.24 |
| 2012/0201504 | A1* | 8/2012 | Sen | C03C 13/046 |
| | | | | 264/1.24 |
| 2012/0236881 | A1* | 9/2012 | Nikolajsen | H01S 3/302 |
| | | | | 372/6 |
| 2013/0182999 | A1* | 7/2013 | Jacobsen | G02B 6/02004 |
| | | | | 65/379 |
| 2015/0331182 | A1* | 11/2015 | Robin | C03C 25/1063 |
| | | | | 65/393 |
| 2016/0009589 | A1* | 1/2016 | Billings | G02B 6/0365 |
| | | | | 65/412 |
| 2017/0129800 | A1* | 5/2017 | Billings | C03B 37/01446 |
| 2017/0229838 | A1* | 8/2017 | Dawson | G02B 6/02338 |

FOREIGN PATENT DOCUMENTS

| | | | |
|---|---|---|---|
| EP | 1 426 795 A2 | 6/2004 | |
| EP | 2081074 B1 | 3/2014 | |
| EP | 2111564 B1 | 4/2018 | |
| WO | 03016967 A1 | 2/2003 | |
| WO | 03079074 A1 | 9/2003 | |
| WO | 2007/110081 A2 | 10/2007 | |
| WO | 2009042347 A1 | 4/2009 | |
| WO | 2010003422 A2 | 1/2010 | |
| WO | 2010065788 A1 | 6/2010 | |
| WO | WO-2015144181 A1 * | 10/2015 | ......... G02B 21/0032 |
| WO | 2016045678 A1 | 3/2016 | |
| WO | 2016/095923 A1 | 6/2016 | |

OTHER PUBLICATIONS

Dragic et al., "Characterization of defect luminescence in Yb doped silica fibers: part I NBOHC," Opt. Express 16, 4688-4697 (2008) (Year: 2008).*

He et al., Significant improvement of gamma radiation resistance in $CeO_2$ doped phosphate glass by co-doping with $Sb_2O_3$, Optical Materials Express, V. 7, N. 3, Mar. 1, 2017 (Year: 2017).*

Kobelke et al., Highly germanium and lanthanum modified silica based glasses in microstructured optical fibers for non-linear applications, Optical Materials 32 (2010) 1002-1006 (Year: 2010).*

Schuster at al., Microstructured fibers with highly nonlinear materials, Opt Quant Electron (2007) 39:1057-1069 (Year: 2007).*

Schuster at al., Material and technology trends in fiber optics, De Gruyter, 2014, DOI: https://doi.org/10.1515/aot-2014-0010 (Year: 2017).*

Troles et al., Original designs of chalcogenide microstuctured optical fibers, Advanced Device Materials, 3:1, 7-13, DOI: 10.1080/20550308.2017.1312053, 2017 (Year: 2017).*

Chiodini, et al. "Ce-doped $SiO_2$ optical fibers for remote radiation sensing and measurement", Proc. SPIE 7316, Fiber Optic Sensors and Applications VI, 731616 (Apr. 27, 2009); https://doi.org/10.1117/12.818507 (Year: 2009).*

Dawson et al., High gain, high power Nd3+ fiber laser at 1427nm, LLNL-CONF-704641, Advanced Solid State Lasers Conference, Oct. 7, 2016. (Year: 2016).*

Office Action (The First Office Action) dated Feb. 17, 2022, by the State Intellectual Property Office of the People's Republic of China in corresponding Chinese Patent Application No. 201880048880.6, and an English Translation of the Office Action. (17 pages).

Colaizzi, J. et al.,"Mechanical Properties of Aluminum Fluoride Glass Fibers" SPIE, vol. 1591, Infrared Fiber Optics III, 1991, 9 pages.

Shahriari, M.R. et al., "Synthesis and Characterization of Aluminum Fluoride-Based Glasses and Optical Fibers", Materials Science Forum, 1988 Trans Tech Publications Ltd, Switzerland, vols. 32-33, pp. 99-105.

Dejneka et al., "$LA_2O_3$-$AL_2O_3$-$SIO_2$ Glasses For High-Power, YB3+-Doped, 980-NM Fiber Lasers", Journal of the American Ceramic Society, Blackwell Publising, vol. 85, No. 5, May 1, 2002, pp. 1100-1106.

International Search Report (PCT/ISA/210) dated Nov. 2, 2018, by the European Patent Office as the International Searching Authority for International Application No. PCT/EP2018/070038.

Kobelke et al., "Multicomponent Glass Microstructured Fibers for Nonlinear Applications", Proceedings of SPIE, vol. 6990, Apr. 25, 2008, pp. 1-12.

Kudlinski et al., "Dispersion Engineered Photonic Crystal Fibers for CW-Pumped Supercontinuum Sources", Journal of Lightwave Technology, vol. 27, No. 11, Jun. 1, 2009, pp. 1556-1564.

UK Search Report dated Jan. 10, 2018.

Written Opinion (PCT/ISA/237) dated Nov. 2, 2018, by the European Patent Office as the International Searching Authority for International Application No. PCT/EP2018/070038.

Ranka et al., "Visible Continuum generation in air silica microstructure optical fibers with anomalous dispersion at 800 nm", Optics Letters, 2000, vol. 25, pp. 25-27.

Humbach et al., "Analysus of OH Absorption Bands in Synthetic Silican", Journal of Non-Crystalline Solids 203, 1996, pp. 19-26.

Malmstrom et al., "Photodarkening Resistant Yb/Ce/Al Silican 980 nm Fiberlaser", Conference on Lasers and Electro-Optics (CLE)) and Quantum Electronics and Laser Science Conference (QELS), published 2010, 2 pages.

Office Action (Second Office Action) dated Oct. 8, 2022, by the Chinese Patent Office in corresponding Chinese Patent Application No. 201880048880.6. (7 pages).

Office Action (Communication pursuant to Article 94(3) EPC) dated Jul. 15, 2021, by the European Patent Office in corresponding European Application No. 18 7 45 590.2-1209, (7 pages).

Office Action dated Dec. 15, 2022, by the Israeli Patent Office in corresponding Israeli Patent Application No. 272073, (5 pages).

* cited by examiner

REDUCING LIGHT-INDUCED LOSS IN OPTICAL FIBRE

FIELD

This specification relates to reducing light-induced loss in optical fibre.

BACKGROUND

At high power levels, photodarkening can occur in optical fibre due to light-induced defects, particularly in the visible region of the electromagnetic spectrum. One mechanism for photodarkening is the creation of non-bridging oxygen hole centre (NBOHC) defects in the optical fibre. NBOHCs create significant loss in the visible wavelength region of the spectrum centred at approximately 615 nm. Since NBOHCs are created by light propagating through the optical fibre, the resulting loss increases the more the optical fibre is used, thus limiting its useful lifetime.

SUMMARY

This specification provides a supercontinuum source, comprising a pump source and a supercontinuum generator configured for receiving light derived from the pump source and for generating supercontinuum light. The supercontinuum generator may comprise a nonlinear microstructured optical fibre having a core region comprising silica. At least a part of the core region is doped with a dopant selected to reduce light-induced non-bridging oxygen hole centre loss in the nonlinear microstructured optical fibre. The concentration of the dopant is sufficient to provide resistance against degradation of the supercontinuum power in the visible region of the spectrum.

Note that in the art, the term "doped" is used to distinguish from "undoped" fibres in which the quantity of dopant is negligible (e.g. at a level below 1000 ppm).

The dopant may comprise aluminium. Alternatively, or in addition, the dopant may comprise cerium, phosphorus and/or boron.

By reducing degradation of the supercontinuum power in the visible region of the spectrum, the useful lifetime of the supercontinuum source is extended for applications in which significant power in the visible region of the spectrum is desired.

The concentration of the dopant may be sufficient to improve the transmission loss at 615 nm after 1200 hours of pumping (compared to the situation in which the fibre is not doped with the dopant and pumped for the same period). The improvement (i.e. reduction) in transmission loss (e.g. after 1200 hours pumping) may be more than 0.1 dB/km, more than 0.5 dB/km, more than 1 dB/km, more than 5 dB/km, more than 10 dB/km, more than 50 dB/km, more than 100 dB/km, more than 200 dB/km, more than 500 dB/km, or more than 600 dB/km.

The dopant may be provided in a doped region of the core region, which may be the whole core region, a single part of the core region (e.g. a single longitudinally-extending part of the core region), or a plurality of parts of the core region (e.g. separate parts which are not contiguous with one another). In various embodiments, the concentration of the dopant in the doped region is greater than 1000 ppm. The number of dopant atoms in the doped region may be greater than 0.05% of the number of silicon atoms in the doped region, greater than 0.1% of the number of silicon atoms in the doped region, greater than 1% of the number of silicon atoms in the doped region, greater than 3% of the number of silicon atoms in the doped region, greater than 8% of the number of silicon atoms in the doped region, or greater than 20% of the number of silicon atoms in the doped region.

In some embodiments, there is a "trade-off" for the reduction of degradation of the supercontinuum power that occurs in the visible region of the spectrum; in particular the presence of the dopant may also increase loss in the blue and/or ultraviolet (UV) regions of the spectrum. In some embodiments the transmission loss of the doped optical fibre at 400 nm may be greater than 600 dB/km, greater than 750 dB/km, greater than 1000 dB/km, greater than 1500 dB/km, greater than 2000 dB/km, greater than 2,500 dB/km, or greater than 3000 dB/km.

The core region may have a generally circular cross section. The core diameter may be less than 10 μm (e.g. around 8 μm), less than 5 μm, less than 4 μm, less than 3 μm, or less than 2 μm. The core region may comprise the core of the optical fibre.

The core region may include a further dopant selected to control the refractive index of the core region to compensate for at least part of the change in refractive index that would otherwise be caused by the presence of the dopant. Alternatively, or in addition, the further dopant may act in combination with the dopant to further improve lifetime, e.g. by further reducing light-induced non-bridging oxygen hole centre loss in the nonlinear microstructured optical fibre. The further dopant may comprise fluorine. In some embodiments the further dopant may comprise cerium.

Accordingly, in some embodiments the core region may be co-doped, for example the core region may be doped with: aluminium and fluorine; cerium and fluorine; phosphorus and fluorine; boron and fluorine; or aluminium and cerium.

The core region may comprise first and second longitudinally-extending regions, wherein the first longitudinally-extending region comprises a first doped region including the dopant and the second longitudinally-extending region comprises a second doped region including the further dopant. The second longitudinally-extending region may be doped with the further dopant but not with the dopant.

In some embodiments the second longitudinally-extending region is disposed around (e.g. surrounds) the first longitudinally-extending region. For example, the second longitudinally-extending region may have an annular cross section which surrounds the first longitudinally-extending region.

The second longitudinally-extending region may comprise a plurality of distinct longitudinally-extending regions, each having a substantially circular cross section.

The first longitudinally-extending region may have a substantially circular cross section.

The first and second longitudinally-extending regions may be configured such that the core region has a desired average refractive index, e.g. equal to that of silica. For example, the concentration of the dopant and/or the concentration of the further dopant may be chosen so that the core region has a targeted average refractive index, e.g. equal to that of silica. Alternatively or in addition, the location and/or shape of the first and/or second regions may be chosen so that the core region has a targeted average refractive index, e.g. equal to that of silica.

The core region of the microstructured optical fibre may comprise hydrogen and/or deuterium. In one example the microstructured optical fibre comprises molecular hydrogen and/or deuterium in gaseous form. The hydrogen and/or deuterium may be bound in the core region of the microstructured optical fibre. In some examples the hydrogen and/or deuterium may be chemically bound to the core region. In some examples the hydrogen and/or deuterium may be chemically bound to the core region so as to form OH and/or OD.

The concentration of hydrogen and/or deuterium may be above 1 part per billion, above 10 parts per billion, above 100 parts per billion, above 1 parts per million, above 100 parts per million, above 1000 parts per million, above 2000 parts per million, or above 10,000 parts per million, wherein parts per million (ppm) and parts per billion (ppb) are considered as a molar ratio of OH and/or OD to $SiO_2$ (or of $H_2$ and/or $D_2$ to $SiO_2$).

The microstructured optical fibre may comprise a coating to act as a hydrogen/deuterium diffusion barrier. The diffusion barrier may prevent diffusion of free molecules of hydrogen and/or deuterium.

The microstructured optical fibre may further comprise a cladding region, wherein the difference between the refractive index of the core region and the effective refractive index of the cladding region is less than $10^{-4}$, or less than $10^{-5}$.

The microstructured optical fibre may have a length of less than 5 m, about 5 m, or greater than 5 m.

The supercontinuum generator may comprise a further microstructured optical fibre located either upstream or downstream of the microstructured optical fibre. The microstructured optical fibre and the further microstructured optical may have different waveguiding (e.g. dispersion) properties and/or different material (e.g. absorption) properties.

The further microstructured optical fibre may have a lower loss in the blue region of the spectrum compared to the microstructured optical fibre. The microstructured optical fibre and the further microstructured optical fibre may have substantially circular cores, each having different diameters.

In some embodiments, at least a portion of the core region of the microstructured optical fibre and/or the further microstructured optical fibre may be tapered along its length. For example, an input region of the core region of the microstructured optical fibre may be tapered.

This specification also provides a passive optical fibre having a core region comprising silica, wherein the core region is doped with aluminium. As will be understood by those skilled in the art, the term "passive" is a term of art used to distinguish from so-called "active" fibres; an "active" fibre is a fibre which is doped with a gain material such as ytterbium or erbium to provide optical gain when pumped at an appropriate pump wavelength: a passive fibre contains no such "active fibre" dopants.

The passive optical fibre may be a supercontinuum optical fibre and/or a large mode area fibre. A supercontinuum optical fibre may comprise a nonlinear optical fibre. A large mode area fibre may comprise a core region having a diameter of greater than 5 micron. In some embodiments the passive optical fibre (e.g. supercontinuum optical fibre and/or large mode area fibre) is a microstructured optical fibre.

The core region may comprise the core of the optical fibre. The core region of the passive optical fibre may include at least one co-dopant selected to control the refractive index of the core region to compensate for at least part of the change in refractive index that would otherwise be caused by the presence of aluminium. In some embodiments, the core region is co-doped with fluorine.

The core region may comprise first and second longitudinally-extending regions, wherein the first longitudinally-extending region is doped with aluminium and the second longitudinally-extending region is doped with at least one co-dopant.

The aluminium may be provided in a doped region of the core region, which may be the whole core region, a single, contiguous, part of the core region (e.g. a single longitudinally-extending part of the core region), or a plurality of parts of the core region (e.g. separate parts which are not connected to one another). The number of aluminium atoms in the doped region may be greater than 0.1% of the number of silicon atoms in the doped region, greater than 1% of the number of silicon atoms in the doped region, greater than 3% of the number of silicon atoms in the doped region, greater than 8% of the number of silicon atoms in the doped region, or greater than 20% of the number of silicon atoms in the doped region.

As will be understood by those skilled in the art, the term "light" as used herein is not limited to visible light and instead includes any suitable electromagnetic radiation such as infrared light (including near and far infrared light), visible light and ultraviolet light.

BRIEF DESCRIPTION OF THE FIGURES

Various embodiments will now be described with reference to the accompanying figures, in which.

DETAILED DESCRIPTION

Figure 1:
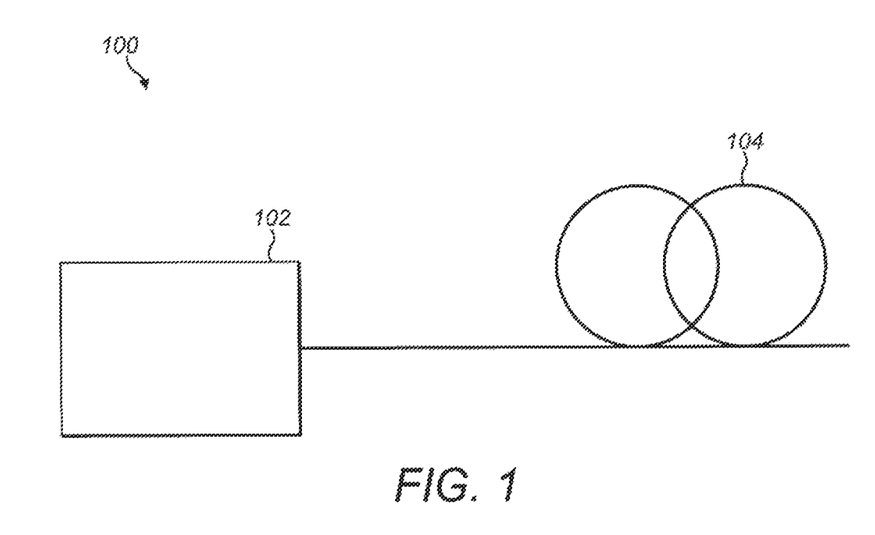
FIG. 1 is a schematic illustration of a supercontinuum source.

FIG. 1 shows a supercontinuum source 100 according to one example. As shown, the supercontinuum source 100 includes a pump source 102 and a supercontinuum generator 104.

Supercontinuum generation is known per se and will not be described in detail here. Reference is directed to "Visible continuum generation in air silica microstructure optical fibres with anomalous dispersion at 800 nm", J. K. Ranka, R. S. Windeler, and A. J. Stentz, Optics Letters, 2000. Vol. 25: p. 25-27.

Pump Source 102

The pump source may configured to generate short optical pulses. For example, the pump source may be configured to generate optical pulses having a full width at half maximum (FWHM) duration of less than 100 ns, less than 10 ns, less than 1 ns, less than 100 ps, less than 10 ps, less than 1 ps, less than 500 fs or less than 100 fs.

In some examples the pump source may be configured to generate a pulsed output or alternatively a continuous wave output, at a wavelength in the Ytterbium gain band, for example around 1 micron, such as around 1.064 micron.

In embodiments in which a pulse train is generated by the pump source, the pulse train may be generated with a repetition rate of greater than 10 KHz, greater than 100 KHz, greater than 1 MHz, greater than 10 MHz, greater than 20 MHz, greater than 50 MHz, or greater than 100 MHz.

In various examples the pump source may be configured to produce an average power of greater than 1 mW, greater than 10 mW, greater than 100 mW, greater than 1 W, greater than 2 W, greater than 5 W, greater than 10 W, greater than 20 W, or greater than 50 W.

The pump source may include a seed source and one or more optical amplifiers. The seed source may comprise an oscillator such as a gain switched diode or a modelocked fibre laser. The output from the seed source may be amplified by the one or more amplifiers, which may include an amplifier chain including a pre-amplifier and one or more further amplifiers. Suitable systems for obtaining power, wavelength, pulse duration, and repetition rate characteristics suitable for supercontinuum generation in microstructured optical fibres are known per se and will not be described in detail here. Reference is directed to European Patent EP2081074B1 and the documents and commercial products referenced therein.

Supercontinuum Generator 104

The supercontinuum generator 104 may comprise a microstructured optical fibre 104 which is "pumped" by the pump source 102 to form a supercontinuum. A microstructured optical fibre includes a core region and a cladding region. The core region may be substantially circular and may for example have a core diameter of less than 10 μm, less than 5 μm, less than 4 μm, less than 3 micron, or less than 2 micron. The cladding region includes longitudinally extending features (e.g. air holes) disposed about the cladding region, where the features have an index of refraction that is different than that of the material surrounding the features. The features facilitate light guidance via one or more mechanisms, such as, for example, index guidance or via the creation of a photonic bandgap. Microstructured optical fibres include so-called holey fibres, photonic crystal fibres, and air clad fibres.

As will be understood by those skilled in the art, the longitudinally-extending features in the cladding region may give rise to an "effective refractive index" of the cladding region, defined for the fundamental space filling mode. In some examples described herein, the difference between the refractive index of the core region and the effective refractive index of the cladding region may be less than $10^{-4}$, or less than $10^{-5}$. The solid areas of a microstructured optical fibre may be formed of doped or undoped silica.

The supercontinuum generator 104 may include a microstructured optical fibre having a core region comprising silica, the core region including a first dopant selected to reduce light-induced non-bridging oxygen hole centre loss in the microstructured optical fibre. The first dopant may comprise aluminium. The number of aluminium atoms may be greater than 0.05% of the number of silicon atoms in the aluminium-doped region, greater than 0.1% of the number of silicon atoms in the aluminium-doped region, greater than 1% of the number of silicon atoms in the aluminium-doped region, greater than 3% of the number of silicon atoms in the aluminium-doped region, greater than 8% of the number of silicon atoms in the aluminium-doped region, or greater than 20% of the number of silicon atoms in the aluminium-doped region.

The core region may also include a second dopant selected to control the refractive index of the core region to compensate for at least part of the change in refractive index that would otherwise be caused by the presence of the first dopant. The second dopant thus prevents unwanted waveguide effects which might otherwise be caused by the presence of the first dopant. For example, absent the second dopant, the first dopant may change the refractive index in such a way that the optical fibre becomes multimode at wavelengths at which single mode operation is desired, due to an undesired variation in the cut-off wavelength for the $LP_1$ mode of the fibre. The second dopant may be included to prevent this by at least partially compensating for the refractive index change that would otherwise be introduced by the first dopant. Alternatively, or in addition, the co-dopant may have a positive effect on lifetime, e.g. it may act to further reduce light-induced non-bridging oxygen hole centre loss in the microstructured optical fibre.

The second dopant may comprise fluorine. Co-doping using aluminium and fluorine may be referred to herein as Al:F doping. A fibre having a core region doped with Al:F may be referred to herein as an "Al:F doped fibre".

Figure 2A:
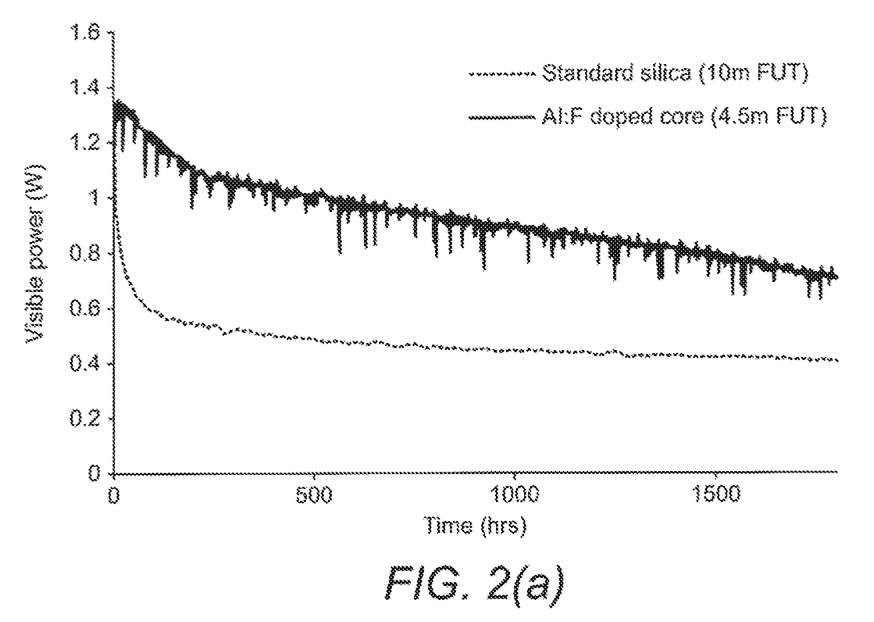
FIG. 2 illustrates the results of an experiment in which two different optical fibres under test (FUT) were pumped and the output power and spectrum were measured.
Figure 2B:
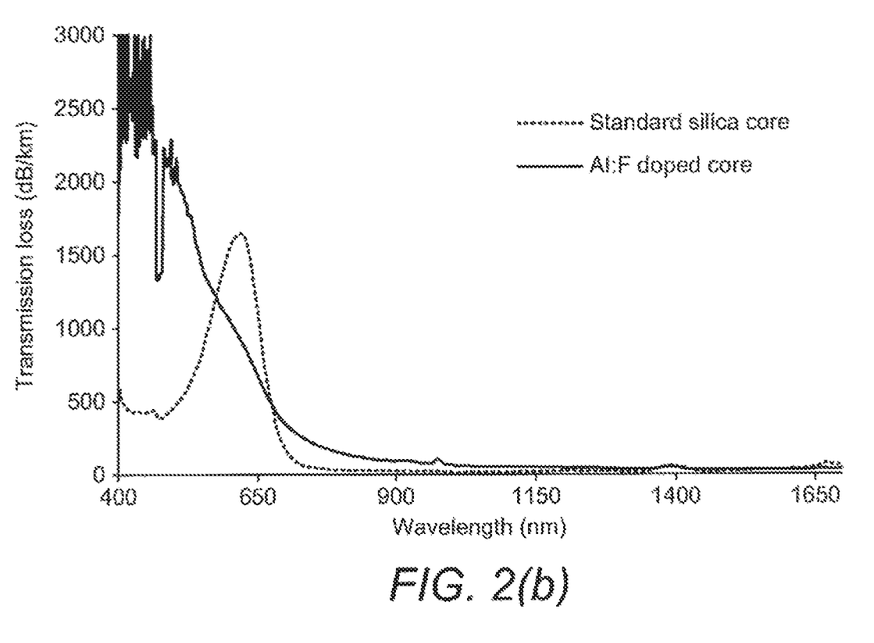

FIG. 2 illustrates the results of an experiment in which two different optical fibres were pumped and the output power and spectrum were recorded. The dashed line in FIG. 2(a) shows the output average visible power as a function of time for a pure silica microstructured optical fibre of length 10 m pumped with a constant pump power. The solid line shows the output average visible power as a function of time for a microstructured optical fibre of length 4.5 m with an Al:F doped core region, pumped with a constant pump power. FIG. 2(b) shows the results of loss measurements conducted after pumping the pure silica fibre (dashed line) and Al:F doped fibre (solid line) for 1200 hrs.

FIG. 2(b) clearly shows the NBOHC absorption peak at 615 nm for the pure silica microstructured optical fibre (dashed line). In contrast, for the Al:F doped fibre (solid line), FIG. 2(b) shows significantly less absorption at 615 nm, indicating that NBOHC loss has been reduced due to the presence of the dopant. Thus the experiment indicates that degradation of the supercontinuum power in at least part of the visible region of the spectrum is mitigated due to the presence of the dopant. The trade-off is a larger ultraviolet (UV) loss tail which appears in the case of Al:F doping as shown in FIG. 2(b).

Figure 3:
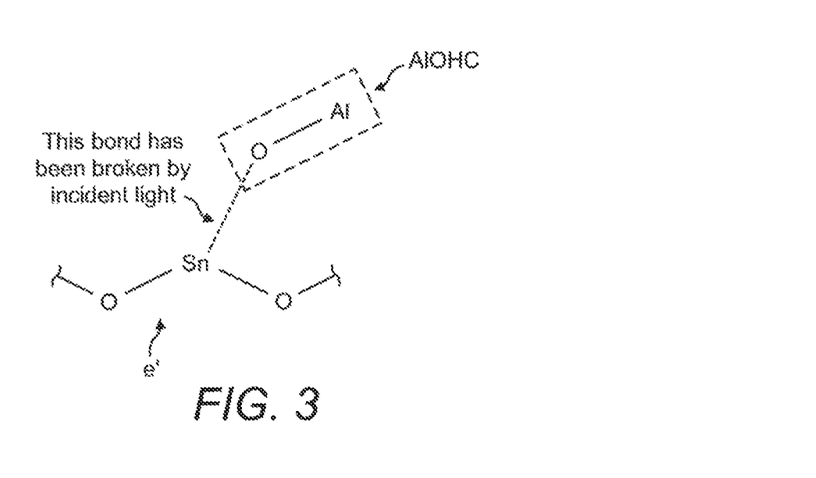
FIG. 3 schematically illustrates formation of an aluminium oxygen hole centre.

NBOHCs are formed in pure silica when a silica bond is broken to form an NBOHC and an e' defect. Without wishing to be bound by theory, one possible explanation for the reduction in NBOHC formation in Al:F doped silica is that in Al:F doped silica, NBOHC formation may be substituted by a process in which a photon breaks a Si—O—Al bond to form an aluminium oxygen hole centre (AlOHC) and e'. Accordingly, the reduced peak at 615 nm in FIG. 2(b) can be attributed to different optical properties of AlOHC and NBOHC defects. Formation of an AlOHC is schematically illustrated in FIG. 3.

Figure 4:
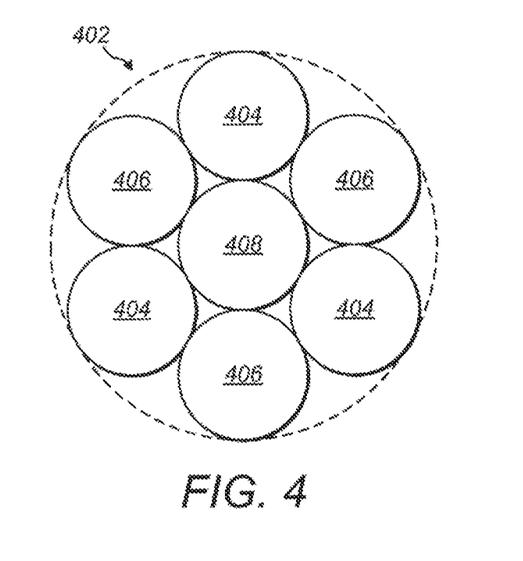
FIG. 4 is a cross sectional illustration of an AL:F doped core region of an example microstructured optical fibre.

FIG. 4 is a cross sectional illustration of an AL:F doped core region of an example microstructured optical fibre 400. As shown, the core region 402 of the example optical fibre 400 includes a number of separate regions 404, 406, 408. Some regions 404 are doped with aluminium. Other regions 406 are doped with fluorine. Other regions 408 are undoped. Including doped and/or undoped regions as separate longitudinally-extending regions within the core region of the microstructured fibre facilitates manufacture and allows for improved control of the overall refractive index of the core region.

Alternatively, the central region 408 may be doped with aluminium and some or all of the surrounding regions 404, 406 may be doped with the further dopant (e.g. fluorine). In some embodiments the region of the core that is doped with the further dopant (e.g. fluorine) may form an annular ring around a central region that is doped with the first dopant.

In various embodiments the doped regions are configured to provide a targeted average refractive index, e.g. equal to that of silica. For example, the concentration of aluminium and/or the concentration of the further dopant may be chosen so that the core as a whole (or a region thereof) has a targeted average refractive index, e.g. equal to that of silica. Alternatively or in addition, the location and/or shape of the region that is doped with aluminium (and/or the location and/or shape of the region that is doped with the further dopant) may be chosen so that the core as a whole (or a region thereof) has a targeted average refractive index, e.g. equal to that of silica.

In some embodiments, the supercontinuum generator 104 comprises a single microstructured optical fibre. In other embodiments the supercontinuum generator may comprise more than one microstructured optical fibre. For example, the supercontinuum generator may comprise two or more fibres coupled (e.g. fusion spliced) together in series. Hence, a fibre "cascade" may be formed. The fibres in the cascade may have different waveguiding properties and/or different material properties.

Figure 5:
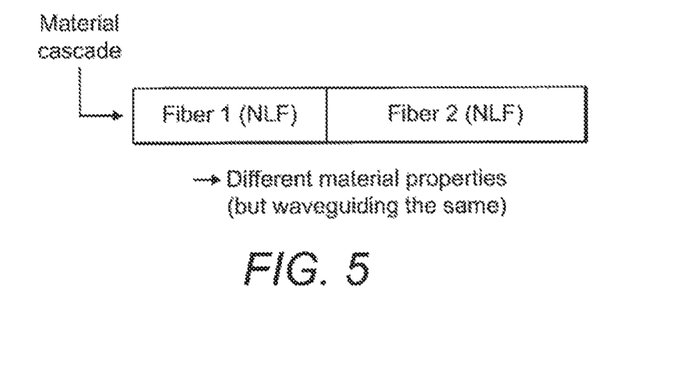
FIG. 5 illustrates an example cascade configuration comprising a first microstructured optical fibre and a second microstructured optical fibre downstream of the first microstructured optical fibre.

FIG. 5 illustrates an example cascade configuration comprising a first microstructured optical fibre and a second microstructured optical fibre downstream of the first microstructured optical fibre. The first and second fibres have different material properties but the same waveguiding properties. For example, the first fibre may have an Al:F doped core region for more efficient supercontinuum generation and reduced NBOHC formation. The material properties of the second fibre may be optimised for lower material absorption at blue and/or UV wavelengths. The lower blue and/or UV absorption of the second fibre acts to compensate for increased UV loss tail that may occur in the first fibre due to Al:F doping in the core region. Thus, this configuration leverages the benefits resulting from Al:F doping whilst mitigating for its disadvantages.

In a variation, the waveguiding (e.g. dispersion) characteristics of the first and second fibres may be different, in addition to the material properties being different. For example, the waveguiding properties of the first fibre may be optimised for red supercontinuum generation and the waveguiding properties of the second fibre may be optimised for blue supercontinuum generation. Although in some embodiments, the microstructured optical fibre(s) of a supercontinuum generator may be untapered, in some embodiments a supercontinuum generator may comprise one or more tapered optical fibres. For example, a supercontinuum generator may include two untapered microstructured fibre sections of different diameters and a tapered fibre "mode adaptor" between the two untapered fibres. Alternatively, a microstructured optical fibre may include an input region which is tapered.

Although the first dopant preferably comprises aluminium, in any of the embodiments described herein the first dopant may alternatively (or in addition) comprise cerium, boron or phosphorous, or another suitable dopant selected to reduce light-induced non-bridging oxygen hole centre loss in a nonlinear microstructured optical fibre.

Hydrogen/Deuterium Loading

It is known per se to load a microstructured optical fibre of a supercontinuum source with hydrogen and/or deuterium to extend the lifetime of the supercontinuum source. The hydrogen and/or deuterium may be chemically bound in the core region of the fibre and/or may be present as free molecules in the silica glass. Reference is directed to European patent application EP2111564.

Hydrogen and/or deuterium loading of Al:F doped fibres has also been found to have a positive effect on the loss rate. However, for Al:F doped fibres, the hydrogen/deuterium may interact with the AlOHC defects discussed above, thereby reducing the loss that would otherwise result from the presence of these defects. Hence, the presence of the aluminium dopant acts synergistically with hydrogen and/or deuterium loading to provide for improvements to the loss rate and thus enhanced lifetime extension.

Figure 6:
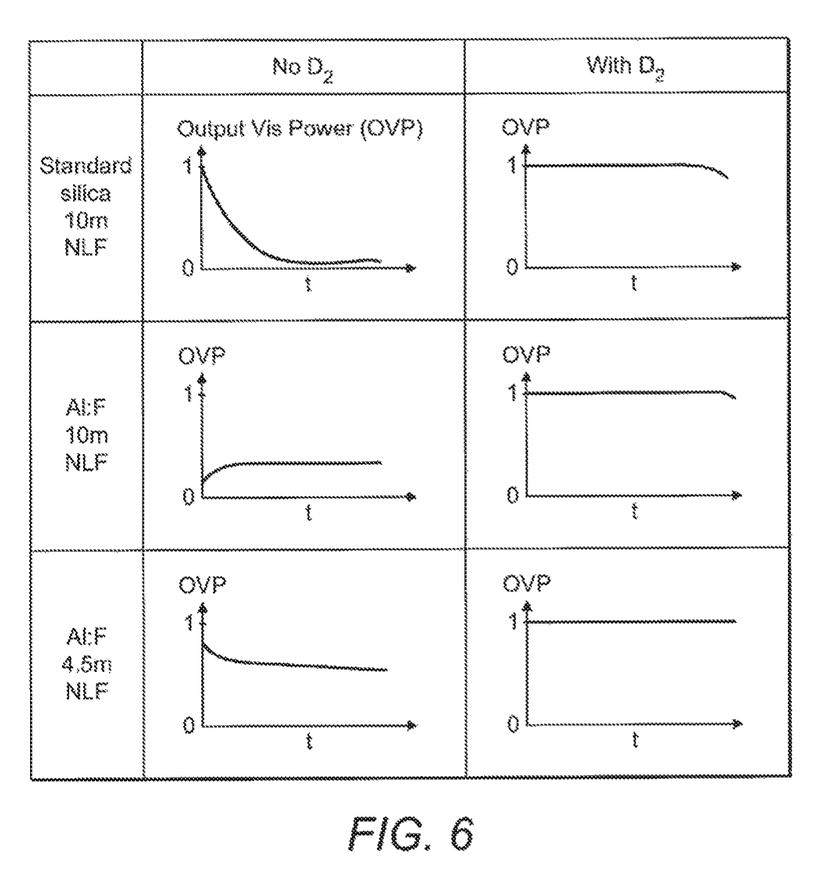
FIG. 6 shows illustrative trend lines indicating how D2 loading mitigates the degradation of visible supercontinuum power in different ways for doped and undoped microstructured nonlinear fibres (NLFs)

Although an Al:F doped fibre may be loaded with hydrogen, deuterium is preferred because hydrogen may bind to oxygen in the fibre forming O—H bonds, resulting in absorption peaks at about 1380 nm and 2210 nm. FIG. 6 shows illustrative trend lines indicating how D2 loading mitigates the degradation of visible supercontinuum power in different ways for standard and Al:F fibres.

Figure 7:
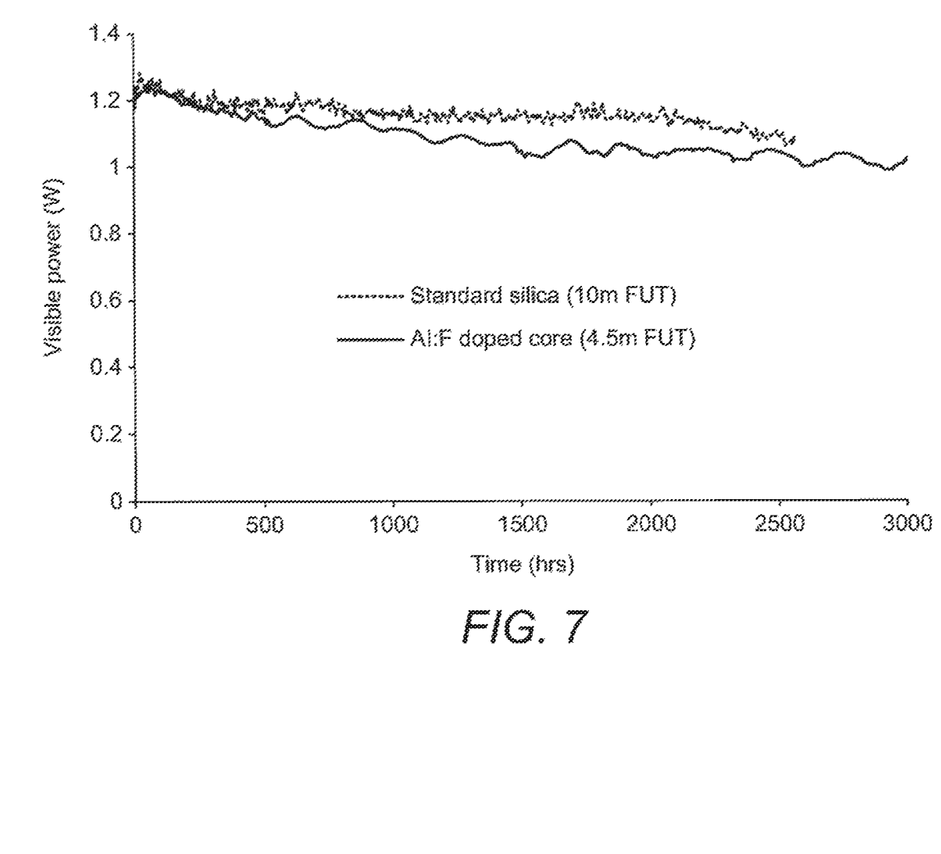
FIG. 7 shows experimental results showing output power in the visible as a function of time for two different fibres under test (FUT).

FIG. 7 illustrates the results of an experiment in which two different deuterium loaded fibres were pumped and the output power in the visible monitored as a function of time. The pump power was kept the same. The dashed line shows output power in the visible as a function of time for a 10 m length of deuterium-loaded silica microstructured optical fibre. The solid line shows output power as a function of time for a 4.5 m length of Al:F doped microstructured optical fibre.

In various embodiments, the concentration of hydrogen and/or deuterium may be above 1 part per billion, above 10 parts per billion, above 100 parts per billion, above 1 parts per million, above 100 parts per million, above 1000 parts per million, above 2000 parts per million, or above 10,000 parts per million. In some embodiments, the concentration of deuterium may fall generally between 60 ppm and 220 ppm, considered as a molar ratio of OD to $SiO_2$ (or of $D_2$ to $SiO_2$). The concentration may be obtained via spectral absorption measurements taken during the fibre draw, with the conversion of OD absorption to ppm in silica considering the values given in O. Hubach et al, "Analysis of OH absorption bands in synthetic silica", Journal of Non-Crystalline Solids 203 (1996) 19-26 (note this reference gives values as a ppm in weight; we convert them to a molar ppm).

In some examples, the microstructured optical fibre may comprise a coating to act as diffusion barrier for hydrogen and/or deuterium.

Other Optical Fibres

Although the discussion above has focussed on nonlinear microstructured optical fibres, in some embodiments the core region of other silica based optical fibres may be doped with aluminium (and/or other appropriate dopants). For example, a large mode area fibre (e.g. a large mode area microstructured optical fibre) for transmitting a high power supercontinuum from one location to another may be doped with aluminium to reduce light-induced non-bridging oxygen hole centre loss in the large mode area fibre.

In some embodiments a passive optical fibre having a core region comprising silica may be provided, wherein the core region is doped with aluminium. Note that in the art, the term "passive" is used to distinguish from so-called "active" fibres; an "active" fibre is a fibre which is doped with a gain material such as ytterbium or erbium to provide optical gain when pumped at an appropriate pump wavelength: a passive fibre contains no such "active fibre" dopants. A passive optical fibre may comprise a microstructured optical fibre or other supercontinuum fibre, or a large mode area fibre.

Many other modifications and variations will be evident to those skilled in the art, that fall within the scope of the following claims:

The invention claimed is:

1. A supercontinuum source, comprising:
   a pump source; and
   a supercontinuum generator configured for receiving electromagnetic radiation derived from the pump source and for generating supercontinuum radiation, the supercontinuum generator comprising a passive nonlinear microstructured optical fibre having a core region comprising silica and a cladding region including longitudinally extending air-holes disposed about the cladding region,
   wherein at least a part of the core region of the microstructured optical fibre is co-doped with aluminium and fluorine, wherein the aluminium dopant reduces light-induced non-bridging oxygen hole centre loss in the nonlinear microstructured optical fibre, and the fluorine compensates for at least part of the change in refractive index that would otherwise be caused by the presence of the aluminium,
   wherein the core region of the microstructured optical fibre further comprises hydrogen and/or deuterium, and
   wherein the aluminium is provided in a doped region, and the number of aluminium atoms in the doped region is greater than 0.05% of the number of silicon atoms in the doped region.

2. The supercontinuum source of claim 1, wherein the core region comprises first and second longitudinally-extending regions, wherein the first longitudinally-extending region comprises the aluminium and the second longitudinally-extending region comprises the fluorine.

3. The supercontinuum source of claim 2, wherein the second longitudinally-extending region is doped with the fluorine but not with the aluminium.

4. The supercontinuum source of claim 2, wherein the second longitudinally-extending region is disposed around the first longitudinally-extending region.

5. The supercontinuum source of claim 4 wherein the second longitudinally-extending region has an annular cross section.

6. The supercontinuum source of claim 2, wherein the second longitudinally-extending region comprises a plurality of distinct longitudinally-extending regions, each having a substantially circular cross section.

7. The supercontinuum source of claim 2, wherein the first and second longitudinally-extending regions are configured such that the core region has an average refractive index equal to that of silica.

8. The supercontinuum source of claim 1, wherein the supercontinuum generator comprises a further microstructured optical fibre located either upstream or downstream of the microstructured optical fibre.

9. The supercontinuum source of claim 1, wherein at least a portion of the core region of the microstructured optical fibre is tapered along its length.

10. A passive optical fibre having a core region comprising silica, wherein the core region is co-doped with aluminium and fluorine, wherein the aluminium is provided in a doped region, and the number of aluminium atoms in the doped region is greater than 0.05% of the number of silicon atoms in the doped region.

11. The passive optical fibre of claim 10, wherein the passive optical fibre is a large mode area fibre.

12. The passive optical fibre of claim 10, wherein the passive optical fibre is a supercontinuum optical fibre.

13. The supercontinuum source of claim 1, wherein the microstructured optical fiber is un-tapered along its length.

14. The supercontinuum source of claim 1, wherein the number of aluminium atoms in the doped region is greater than 0.1% of the number of silicon atoms in the doped region.

15. The supercontinuum source of claim 1, wherein the number of aluminium atoms in the doped region is greater than 1% of the number of silicon atoms in the doped region.

16. The supercontinuum source of claim 1, wherein the number of aluminium atoms in the doped region is greater than 3% of the number of silicon atoms in the doped region.

17. The passive optical fibre of claim 10, wherein the number of aluminium atoms in the doped region is greater than 0.1% of the number of silicon atoms in the doped region.

18. The passive optical fibre of claim 10, wherein the number of aluminium atoms in the doped region is greater than 1% of the number of silicon atoms in the doped region.

19. The passive optical fibre of claim 10, wherein the number of aluminium atoms in the doped region is greater than 3% of the number of silicon atoms in the doped region.

20. The supercontinuum source of claim 1, wherein the core region has a core diameter of less than 10 µm.

21. The supercontinuum source of claim 1, wherein the core region has a core diameter of less than 5 µm.

22. The supercontinuum source of claim 1, wherein the core region has a core diameter of less than 3 µm.

23. The supercontinuum source of claim 12, wherein the core region has a core diameter of less than 10 µm.

24. The supercontinuum source of claim 12, wherein the core region has a core diameter of less than 5 µm.

25. The supercontinuum source of claim 12, wherein the core region has a core diameter of less than 3 µm.

* * * * *